United States Patent
Limbasia et al.

(10) Patent No.: US 9,465,928 B2
(45) Date of Patent: Oct. 11, 2016

(54) NO-CAPTCHA CAPTCHA

(71) Applicant: Verizon Patent and Licensing Inc., Arlington, VA (US)

(72) Inventors: Sunil D. Limbasia, Irving, TX (US); Manah M. Khalil, Coppell, TX (US); Venkata Devaki, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 58 days.

(21) Appl. No.: 14/587,206

(22) Filed: Dec. 31, 2014

(65) Prior Publication Data

US 2016/0188850 A1   Jun. 30, 2016

(51) Int. Cl.
*G06F 7/04* (2006.01)
*G06F 21/31* (2013.01)

(52) U.S. Cl.
CPC .................................. *G06F 21/31* (2013.01)

(58) Field of Classification Search
CPC ........... G06F 21/36; G06F 2221/2133; G06F 2221/2103; G06F 21/31
USPC ............................................................ 726/7
See application file for complete search history.

(56) References Cited

U.S. PATENT DOCUMENTS

| | | | |
|---|---|---|---|
| 2007/0156592 A1* | 7/2007 | Henderson | G06Q 10/06 705/51 |
| 2009/0150983 A1* | 6/2009 | Saxena | G06F 21/36 726/7 |
| 2010/0077060 A1* | 3/2010 | Oz | H04N 21/2225 709/219 |
| 2012/0054834 A1* | 3/2012 | King | G06F 21/31 726/4 |
| 2012/0166335 A1* | 6/2012 | Bakshi | G06F 21/36 705/44 |
| 2012/0254971 A1* | 10/2012 | Hu | G06F 21/36 726/9 |
| 2013/0019285 A1* | 1/2013 | Barborak | G06F 17/27 726/4 |
| 2013/0311768 A1* | 11/2013 | Fosmark | G06Q 20/3223 713/155 |
| 2014/0325627 A1* | 10/2014 | Fee | H04L 63/0807 726/7 |
| 2014/0325657 A1* | 10/2014 | Bailey | H04L 63/1433 726/25 |
| 2015/0161365 A1* | 6/2015 | Hulten | G06F 21/31 726/2 |
| 2015/0161375 A1* | 6/2015 | Ghosh | G06F 21/36 726/7 |
| 2015/0195289 A1* | 7/2015 | Kalgi | H04W 12/10 726/5 |
| 2016/0057143 A1* | 2/2016 | Carlson | G06F 21/45 726/26 |

OTHER PUBLICATIONS

Farrell, Leaky or Guessable Session Identifiers, IEEE, Jan. 2011, p. 88-91.*
Zhang, Zhang's CAPTCHA Architecture Based on Intelligent Interaction via RIA, IEEE, 2010, pp. V6-57-V6-62.*

(Continued)

*Primary Examiner* — Christopher Brown
*Assistant Examiner* — Jenise Jackson

(57) ABSTRACT

A device generates parameters identifying selectively revealed un-obfuscated information associated with administering and assessing a Turing test. The device provides, to a client device, a challenge based on the parameters. The challenge directs the client device to selectively reveal the un-obfuscated information for presentation to a user associated with the client device. The device receives a response, to the challenge, from the client device and determines, based on the response and the parameters, whether the user associated with the client device is human. The device selectively performs an action based on determining whether the user associated with the client device is human.

20 Claims, 8 Drawing Sheets

(56) References Cited

OTHER PUBLICATIONS

Johnston, "Captchas Don't Work: How to Trick Spam Bots With a Smarter Honey Pot," http://www.smartfile.com/blog/captchas-dont-work-how-to-trick-spam-bots-with-a-smarter-honey-pot/, Aug. 6, 2013, 10 pages.

Psinas, "Easy Spam Prevention Using Hidden Form Fields," http://www.sitepoint.com/easy-spam-prevention-using-hidden-form-fields/, Jul. 2, 2012, 10 pages.

Protect Web Form, "Smart Captcha," http://www.protectwebform.com/smartcaptcha, Aug. 10, 2006, 2 pages.

* cited by examiner

510 →

510 →

520 →

NO-CAPTCHA CAPTCHA

BACKGROUND

A CAPTCHA (an acronym for Completely Automated Public Turing test to tell Computers and Humans Apart) is a type of challenge-response test used in a computing environment to determine whether a user of a device is human. For example, a device may provide a challenge, based on a CAPTCHA, to another device and may receive a response to the challenge from the other device. Based on the response, the device may determine whether the user of the other device is human.

DETAILED DESCRIPTION OF PREFERRED EMBODIMENTS

The following detailed description of example implementations refers to the accompanying drawings. The same reference numbers in different drawings may identify the same or similar elements.

In a computing environment, an operator may configure a host device to exchange content and/or share resources with client devices. The operator may wish to prevent excessive and/or malicious use of the content and/or resources by software agents (e.g., "bots"), running on one or more client devices, by configuring the host device to administer, to client devices, a Turing test, such as a CAPTCHA. One implementation of a CAPTCHA may include providing, for display to a user of the client device, an image containing obfuscated characters, and identifying the user as human based receiving a response, from the client device, correctly identifying the obfuscated characters. This implementation exploits a differential ability between humans and software agents to identify obfuscated characters.

However, humans may still have substantial difficulty identifying the obfuscated characters presented by a host device. Thus, implementing a CAPTCHA that relies on identifying obfuscated characters may require considerable effort from a human to provide a correct response and may even result in the host device incorrectly determining that the human is a bot. An operator may avoid substantial disruption to a user's experience by instead implementing a CAPTCHA that relies on selectively revealing un-obfuscated information and assessing the client's response to the selectively revealed un-obfuscated information. A human may simply observe a display to correctly identify the selectively revealed un-obfuscated information, while a software agent may have considerable difficulty distinguishing the selectively displayed information from other information. Such an implementation may, thus, improve a likelihood associated with correctly determining whether a user of a client device is human while simultaneously improving a user experience by only requiring a human to identify un-obfuscated information displayed by the client device and ignore obfuscated and/or concealed information.

Figure 1:
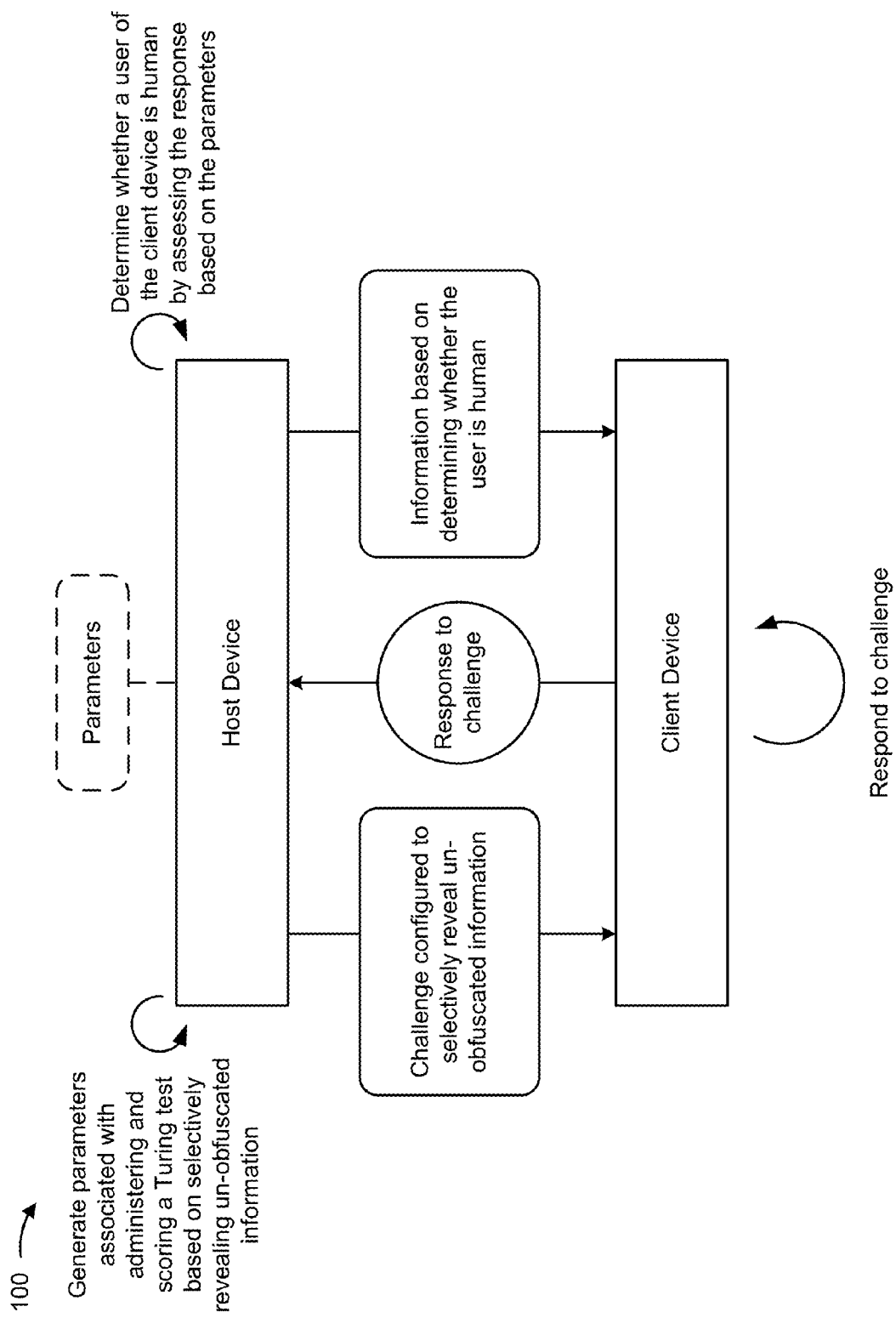
FIG. 1 is a diagram of an overview of an example implementation described herein.

FIG. 1 is a diagram of an overview of an example implementation 100 described herein. Assume, for example implementation 100, that an operator has configured a host device to selectively provide information to a client device based on determining whether a human is operating the client device.

The host device may generate and store parameters associated with administering and scoring a Turing test based on selectively revealing un-obfuscated information. The host device may send a challenge, based on the parameters, which includes instructions directing the client device to selectively reveal un-obfuscated information to a user of the client device. The user, associated with the client device, may respond to the challenge, and the client device may likewise send, to the host device, a response to the challenge. The host device may determine whether the user of the client device is human by assessing the response based on the parameters. The host device may likewise provide, to the client device, information based on determining whether the user is human.

In this way, a host device may determine whether a user of a client device is human, without requiring a human to identify obfuscated characters, by assessing the user's response to un-obfuscated information selectively revealed to the user.

Figure 2:
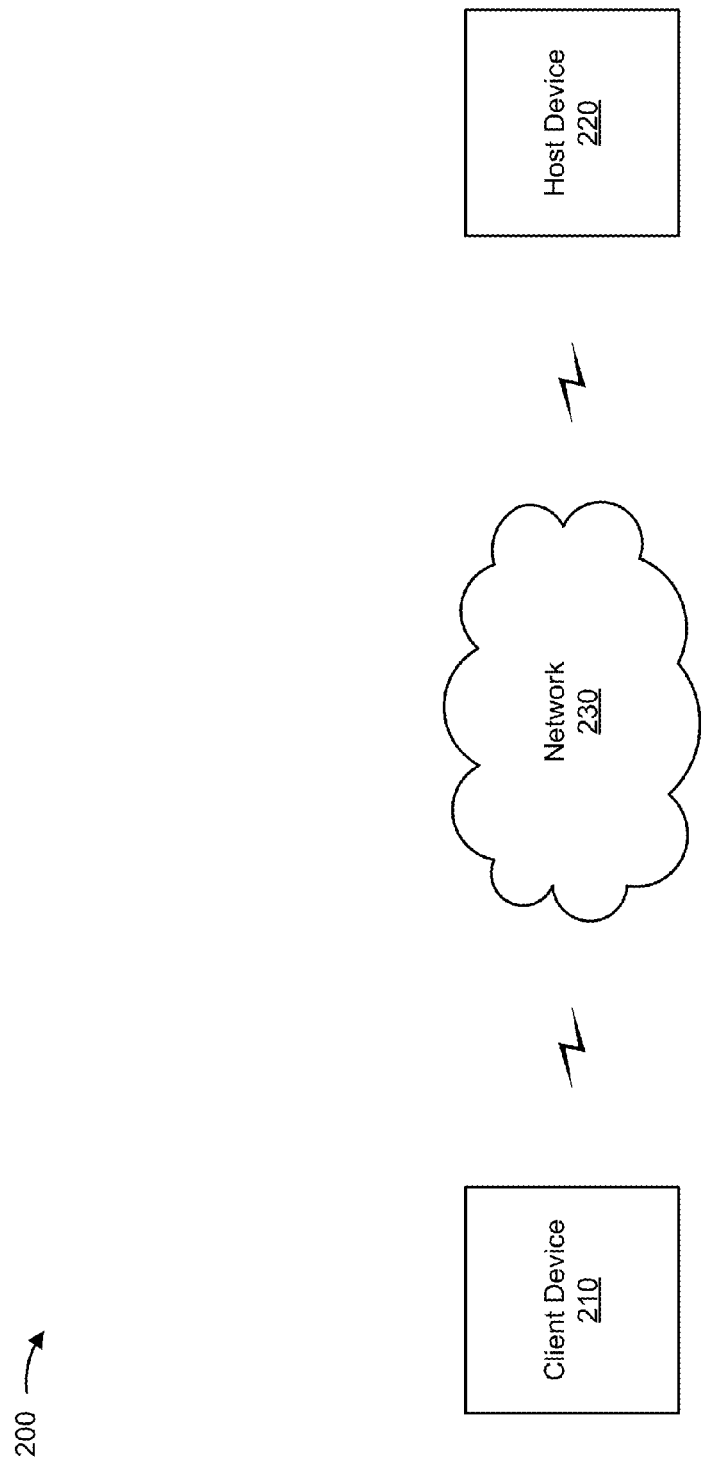
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a host device 220, and a network 230. Devices of environment 200 may interconnect via wired connections, wireless connections, or a combination of wired and wireless connections.

Client device 210 may include one or more devices capable of receiving, generating, storing, processing, and/or providing information associated with receiving and responding to a challenge associated with a Turing test. For example, client device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. Client device 210 may include, or connect to, a digital or analog display that is capable of presenting visual and/or aural content. For example, client device 210 may include as cathode ray tube (CRT) display, a liquid crystal display (LCD), a light-emitting diode (LED) display, a plasma display, or the like. In some implementations, client device 210 may receive information from and/or transmit information to another device in environment 200. For example, client device 210 may receive information from and/or transmit information to host device 220.

Host device 220 may include one or more devices capable of storing, processing, and/or routing information associated with generating, administering, and/or assessing a Turing test, such as a CAPTCHA. In some implementations, host device 220 may include a communication interface that allows host device 220 to receive information from and/or transmit information to other devices in environment 200. For example, host device 220 may receive information from and/or transmit information to client device 210.

Network 230 may include one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
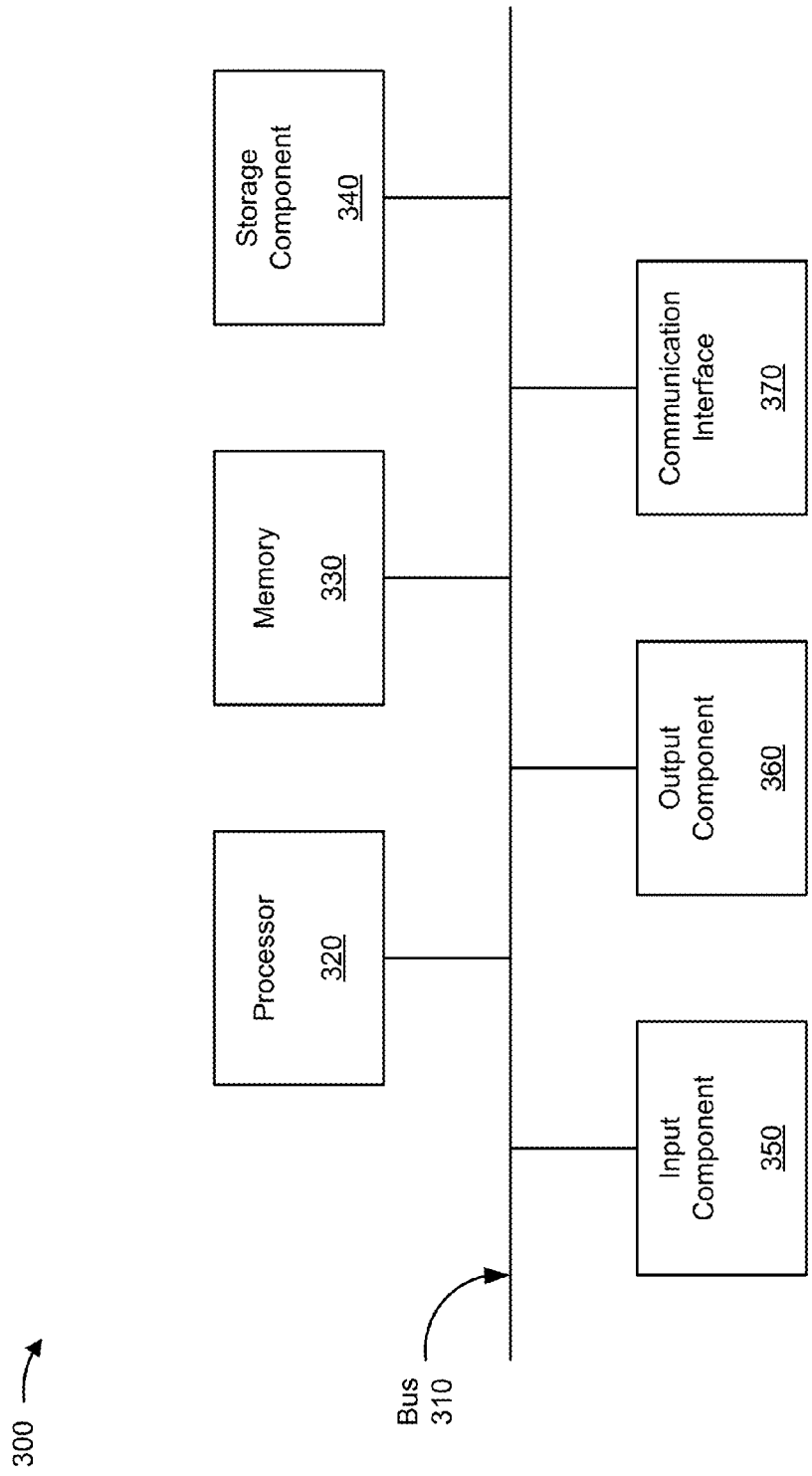
FIG. 3 is a diagram of example components of one or more devices of FIG. 2.

FIG. 3 is a diagram of example components of a device 300. Device 300 may correspond to client device 210 and/or host device 220. In some implementations, client device 210 and/or host device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
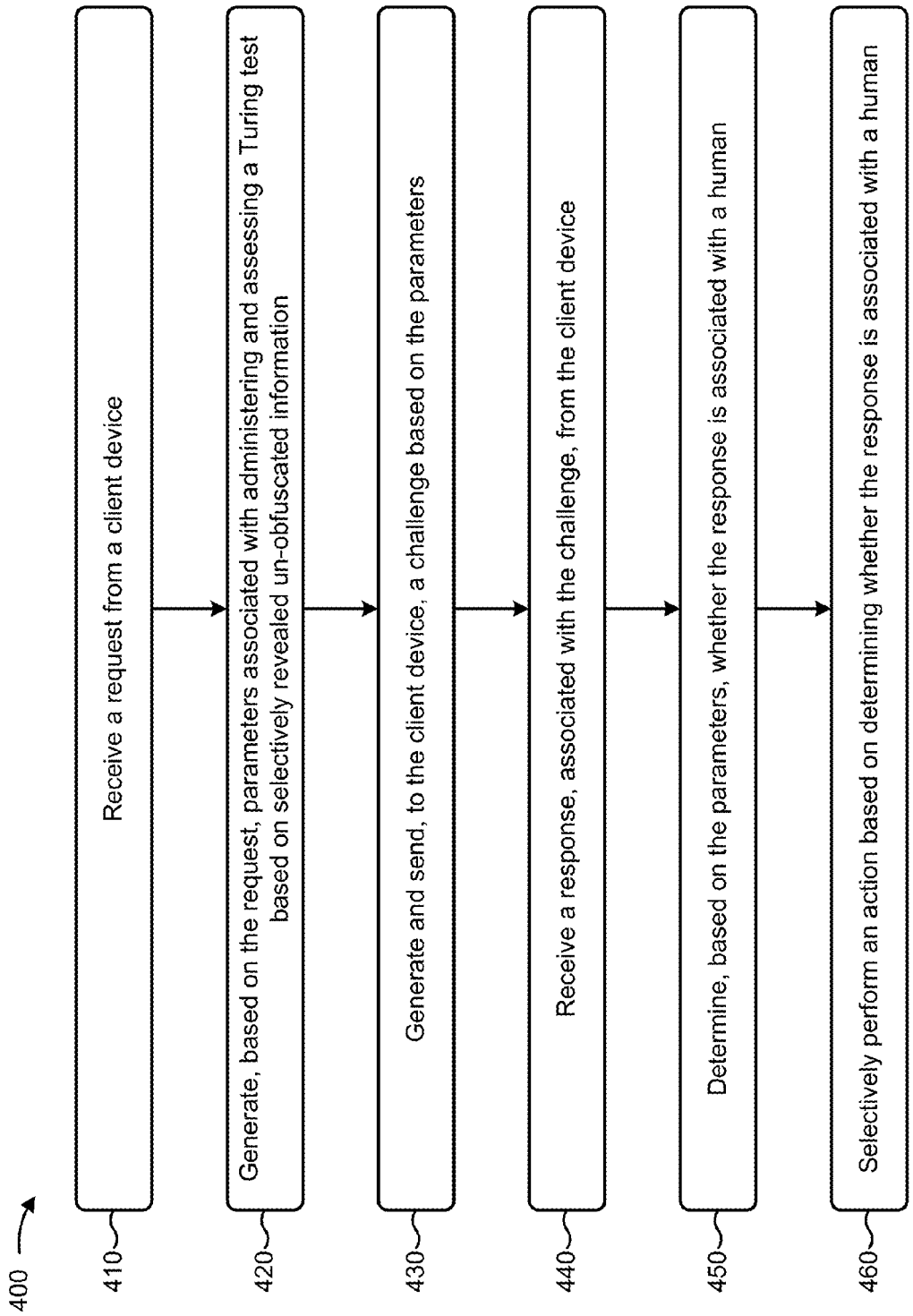
FIG. 4 is a flow chart of an example process for implementing a CAPTCHA to selectively reveal un-obfuscated information.

FIG. 4 is a flow chart of an example process 400 for implementing a CAPTCHA to selectively reveal un-obfuscated information. In some implementations, one or more process blocks of FIG. 4 may be performed by host device 220. Additionally, or alternatively, one or more process blocks of FIG. 4 may be performed by another device or a group of devices separate from or including host device 220, such as client device 210.

As shown in FIG. 4, process 400 may include receiving a request from a client device (block 410). For example, host device 220 may receive a request from client device 210. In some implementations, the request may be associated with accessing a webpage and/or other content associated with host device 220 and/or another device associated with network 230. Alternatively, or additionally, the request may be associated with creating, modifying, deleting, and/or otherwise accessing an account associated with, e.g., sending and/or receiving email, posting to an online forum, commenting on a blog, voting in a poll, or the like. Alternatively, or additionally, the request may be associated with sending and/or receiving content, such as audio, video, text, images, animations, software applications, e-mail addresses, telephone numbers, names, or the like. In this way, host device 220 may identify content and/or resources whose use may be restricted based on determining whether a user of client device 220 is human.

As further shown in FIG. 4, process 400 may include generating, based on the request, parameters associated with administering and assessing a Turing test based on selectively revealing un-obfuscated information (block 420). For example, host device 220 may generate parameters based on the request. In some implementations, host device 220 may generate parameters that are unique to the request, a user device associated with the request, a user associated with the user device, and/or content associated with the request based on information included in and/or associated with the request, such a content identifier, a session identifier, a user identifier, a user device identifier, or the like.

The parameters may identify and/or include information to be revealed as un-obfuscated information. In some implementations, the parameters may identify and/or include information which is not to be revealed (e.g., information which is to be obfuscated, obscured, hidden, un-displayed, and/or otherwise not revealed). In some implementations, the parameters may include information associated with a manner in and/or a degree to which information is to be obfuscated, obscured, hidden, un-displayed, and/or otherwise not revealed. Alternatively, or additionally, the parameters may include information associated with a manner in and/or degree to which information is to be de-obscured, de-obfuscated, and/or otherwise revealed. For example, the parameters may identify and/or include information to which a user's attention is to be drawn. Alternatively, or additionally, the parameters may identify a particular sequence associated with selectively revealing un-obfuscated information and/or one or more portions of un-obfuscated information.

In some implementations, the parameters may identify and/or include one or more metrics associated with assessing an ability to identify a content, manner, and/or degree to which information is revealed and/or not revealed. For example, the metrics may be associated with distinguishing information identified as being revealed (e.g., in a particular manner and/or to a particular degree) from other information (e.g., identified as not being revealed and/or being revealed in a different manner and/or to a different degree). In some implementations, the parameters may include one or more weighting factors associated with the metrics. For example, the weighting factors may be associated with a degree to which a particular metric is associated with predicting whether a user is human.

In some implementations, host device 220 may identify, based on the request, a particular webpage or other content, associated with the request, which includes input fields for a user, of client device 210, to provide, e.g., a name, an address, a username, a password, a personal identification number, or the like. Alternatively, or additionally, the one or more input fields may be associated with selections associated with a subsequent request that client device 210 may send to host device 220, such as one or more links to other content (e.g., uniform resource links ("URLs")). Host device 220 may generate parameters which identify and/or include a quantity of alternative input fields, associated with a corresponding quantity of randomly created field identifiers, for each of the identified input fields. The parameters may randomly identify one or more particular alternative input fields, corresponding to the one or more identified input fields, as un-obfuscated information to be revealed. The parameters may likewise identify the remaining alternative input fields as information not to be revealed. The parameters may include metrics associated with the use and/or content of valid input fields (e.g., identified as being revealed) and/or invalid input fields (e.g., identified as not being revealed).

As further shown in FIG. 4, process 400 may include generating and sending, to the client device, a challenge based on the parameters (block 430). For example, host device 220 may generate, based on the parameters, a challenge and may send information, associated with the challenge, to client device 210. In some implementations, the challenge may include information directing client device 210 to selectively obscure particular information by, e.g., concealing, warping, blurring, resizing, relocating, lightening/brightening, dimming/darkening, jumbling, blotting out, hiding (e.g., displaying a picture, a color, a pattern, an image, etc. on top and/or in place of), blocking, encrypting, fading, replacing (e.g., with other information), constantly or periodically scrolling or moving, or otherwise hiding and/or concealing the particular information and/or other information.

In some implementations, the challenge may include instructions directing client device 210 to selectively reveal particular information by, e.g., un-obscuring the particular information and/or by obscuring, hiding, or otherwise concealing other information. In some implementations, the challenge may include instructions directing client device 210 to selectively reveal and/or obscure information based on the satisfaction of a condition and/or a threshold (e.g., based on a timing condition, user input, a content of the information, a content of other information, an identifier associated with user device 210, an identifier associated with a user of user device 210, or the like). For example, the challenge may include instructions that, when interpreted by client device 210, cause client device 210 to selectively reveal and/or not reveal information, based on the parameters, to present the challenge for display to a user of client device 210.

In some implementations, the challenge may include information associated with the request received from the client device. For example, the request may identify particular requested information (e.g., a webpage, document, or the like), and host device 220 may generate and/or send a challenge based on the requested information. Alternatively, or additionally, host device 220 may modify, based on the challenge, the requested information to send the challenge to client device 210.

In some implementations, the challenge may include the particular webpage identified by host device 220 as being associated with the request and/or another webpage, and the instructions may be code, such as hypertext markup language ("HTML") and/or scripted language (e.g., JavaScript), that, when interpreted by client device 210, selectively reveal un-obfuscated information (e.g., input fields identified, by the parameters, as to be revealed) and/or selectively not reveal other information (e.g., input fields identified, by the parameters, as not to be revealed). Alternatively, or additionally, the information may include text, images, videos, animations, icons, other instructions, or any other information that may be displayed on client device 210. For example, the information may include a video and/or animation that, when played by client device 210, selectively reveals un-obfuscated information.

In some implementations, host device 220 may generate, based on the parameters, a challenge associated with selectively revealing a particular subset of information displayed by (or presented on) the display of client device 210. For example, the challenge may include one or more symbols (e.g., characters) and may include instructions, based by the parameters, to reveal a particular portion of the symbols and/or to reveal symbols in a particular manner (e.g., according to a particular sequence and/or form of presentation and/or revelation). The particular portion may be arranged in a particular sequence and the challenge may include instructions to reveal and/or present the particular portion in the particular sequence and/or in a different sequence based on the parameters. For example, the instructions may be to present and/or reveal the particular information in a first manner (e.g., according to a first sequence) based on a first condition (e.g., at and/or during a first time) and to present and/or reveal the particular information in a second manner (e.g., according to a second sequence) based on a second condition (e.g., at and/or during a second time). Alternatively, or additionally, the challenge may include instructions to selectively reveal information by highlighting one or more portions of un-obfuscated information. Highlighting a portion may include adjusting a manner of revealing the portion to mark or otherwise distinguish the information from other information. In some implementations, the challenge may include an input field for the user, of client device 210, to identify and submit, to host device 220, the selectively revealed un-obfuscated information.

As further shown in FIG. 4, process 400 may include receiving a response, associated with the challenge, from the client device (block 440). For example, host device 220 may receive a response, associated with the challenge, from client device 210. In some implementations, the response may be associated with a user of client device 210 providing input to one or more input fields associated with the challenge. Alternatively, or additionally, the response may include information associated with the user following a link (e.g., URL) and/or making a selection associated with the challenge. Alternatively, or additionally, the response may include information associated with identifying particular parameters, such as a content identifier, a session identifier, a user identifier, a user device identifier, or the like.

As further shown in FIG. 4, process 400 may include determining, based on the parameters, whether the response is associated with a human (block 450). For example, host device 220 may identify parameters associated with the response (e.g., based on a content identifier, a session identifier, a user identifier, a user device identifier, or the like) and may determine, based on the parameters, whether the response is associated with a human. In some implementations, host device 220 may identify metrics, associated with the parameters, and may generate a score, for the response, based on the metrics. Host device 220 may determine whether the response is associated with a human based on the score satisfying a particular threshold. In some implementations, host device 220 may determine a score and/or threshold based on one or more weighting factors associated with the metrics. For example, the weighting factors may assign a higher importance to distinguishing between revealed and not revealed information relative to correctly identifying revealed information. In some implementations, host device 220 may generate a quantity of scores based on the quantity of metrics and may determine whether the response is associated with a human based on determining whether a particular score and/or group of scores satisfies a particular threshold and/or group of thresholds.

In some implementations, host device 220 may determine whether the response is associated with a human based on information, in the response, associated with a user providing input to the input fields identified, by the parameters, as being revealed and/or not revealed. For example, a response including user input associated with input fields configured not to be revealed may indicate that the response is not associated with a human. Alternatively, or additionally, host device 220 may determine whether the response is associated with a human based on information, in the response, associated with a set and/or sequence of characters identified, by the parameters, as being revealed and/or not revealed. For example, a response identifying a set and/or sequence of characters identified as being revealed may indicate that the response is associated with a human. Likewise, a response incorrectly identifying the set and/or sequence of characters identified by the parameters as being revealed and/or identifying a set and/or sequence of characters identified as not being revealed may indicate that the response is not associated with a human.

In some implementations, host device 220 may determine a measure of uncertainty associated with determining whether the response is associated with a human. For example, host device 220 may determine (e.g., based on the response) an uncertainty associated with client device 210's interpretation of the challenge. Client device 210 may lack a software capability associated with interpreting the challenge. For example, client device 210 may implement a software environment (e.g., an operating system, a web browser, a scripted language interpreter, or the like) which is incompatible with instructions included in the challenge. Alternatively, or additionally, client device 210 may lack a hardware capability associated with interpreting the challenge. For example, client device 210 may include and/or connect to an incompatible display (e.g., having insufficient size, resolution, color reproduction, or the like).

Host device 220 may determine the measure of uncertainty based on, e.g., information included in the parameters and/or the challenge. For example, host device 220 may identify, from the parameters and/or the challenge, information associated with assessing one or more potential limitations associated with an interpretation of the challenge. Alternatively, or additionally, host device 220 may determine the measure of uncertainty based on information included in the response. For example, host device 210 may identify, from the response, user input indicating a failure of client device 210 to display some or all of the un-obfuscated information to be presented by the challenge. Alternatively, or additionally, host device 220 may identify, from the response, information associated with a software and/or hardware environment of client device 210 (e.g., based on a browser user-agent string). Host device 220 may use the measure of uncertainty to assess a response and/or to generate a subsequent challenge (e.g., to avoid potential limitations).

As further shown in FIG. 4, process 400 may include selectively performing an action based on determining whether the response is associated with a human (block 460). For example, host device 220 may selectively identify, generate, and/or provide information based on determining whether the response is associated with a human. In some implementations, host device 220 may provide, to client device 210, information requested by client device 210 (e.g., information identified in the request and/or response) based on determining that the request is associated with a human. Alternatively, or additionally, host device 220 may selectively provide client device 210 with access to an account associated with, e.g., sending and/or receiving email, posting to an online forum, commenting on a blog, voting in a poll, or the like. Alternatively, or additionally, host device 220 may selectively send and/or receive, to/from client device 210, content (e.g., associated with a web page), such as audio, video, text, images, animations, software applications, e-mail addresses, telephone numbers, names, or the like.

In some implementations, host device 220 may send no information and/or may deny access by client device 220 based on determining that the response is not associated with a human. Alternatively, or additionally, host device 220 may increment a value associated with a quantity of access attempts by client device 210 based on determining that the response is not associated with a human (e.g., a value associated with a quantity of failed attempts). Alternatively, or additionally, host device 200 may log the determination (e.g., by entering information into a log file and/or sending logging information to another device) based on determining that the response is not associated with a human.

In some implementations, host device 220 may generate and send, to client device 210, another challenge based on determining whether the response is associated with a human and/or based on determining a measure of uncertainty associated with client device 210's interpretation of the challenge. For example, host device 220 may generate a different challenge and/or parameters based on determining whether the response is associated with a human. The different challenge may include different instructions and/or different types of instructions. For example, the challenge may include a different type of code (e.g., associated with a different coding language) and/or a different type of text, image, video, animation, or the like (e.g., encoded in a different size, format, or the like). Alternatively, or additionally, the other challenge may implement a different form and/or manner of revealing and/or obscuring information. Alternatively, or additionally, the other challenge may be associated with a different level of intrusiveness based on determining whether client device 210 is associated with a human (e.g., requiring a different level of user input, effort (e.g., by the user and/or by client device 210), time, or the like).

In this way, host device 220 may restrict access to content and/or resources to humans, thereby preventing abuse by software agents and/or bots.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5D are diagrams of example implementations 500-520 relating to example process 400 shown in FIG. 4. FIGS. 5A-5D show examples of implementing a CAPTCHA to selectively reveal un-obfuscated information.

Figure 5A:
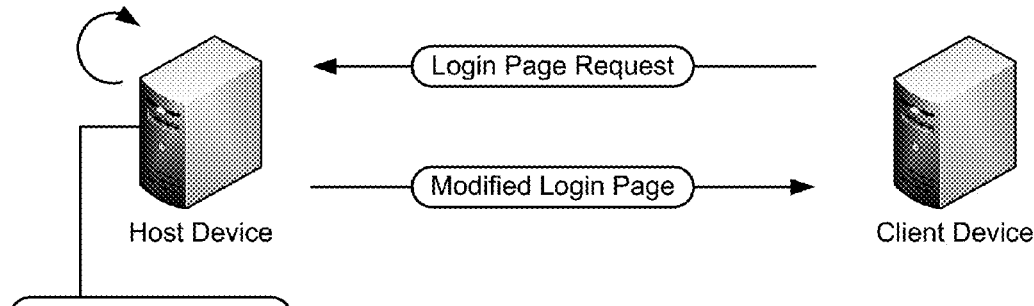
FIGS. 5A-5D are diagrams of example implementations relating to the example process shown in FIG. 4.
Figure 5A:
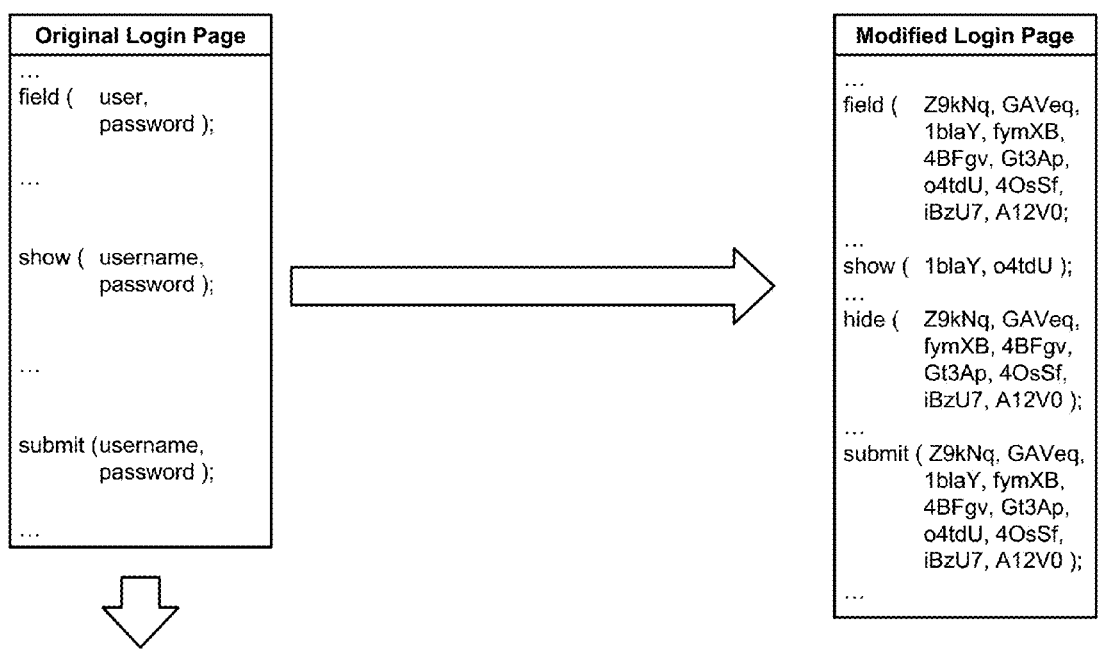

As shown in FIG. 5A, assume, for example implementation 500, that a client device (e.g., client device 210) sends, to a host device (e.g., host device 220), a login page request associated with providing a login page. Assume that, based on receiving the login request, the host device identifies a login page (shown as "Original Login Page") associated with satisfying the request. Assume further that the host device identifies, from the original login page, a username field and a password field, associated with the client device submitting a username and a password, respectively.

Assume that the host device generates parameters based on the login page request received from the client device. Assume that the parameters include five randomly named fields associated with the username field (shown as Z9kNq, GAVeq, 1blaY, fymXB, and 4BFgv) and a random number, from 1 to 5, associated with identifying a particular randomly named field as being a valid field for the username field (e.g., 3, corresponding to field 1blaY). Assume further that the host device generates five randomly named fields associated with the password field (shown as Gt3Ap, o4tdU, 4OsSf, iBzU7, and A12v0) and a random number, from 1 to 5, associated with identifying a particular randomly named field as being a valid field for the password field (e.g., 2, corresponding to field o4tdU).

Assume that the host device modified the original login page to generate a modified login page that identifies the randomly named fields. Assume further that the modified login page includes instructions for showing the fields identified as valid fields (e.g., "show (1blaY and o4tdU);") and hiding the other randomly named fields. Assume further that the modified login page includes instructions to submit input associated with all the randomly named fields. Assume that the host device sends the modified login page to the client device.

Figure 5B:
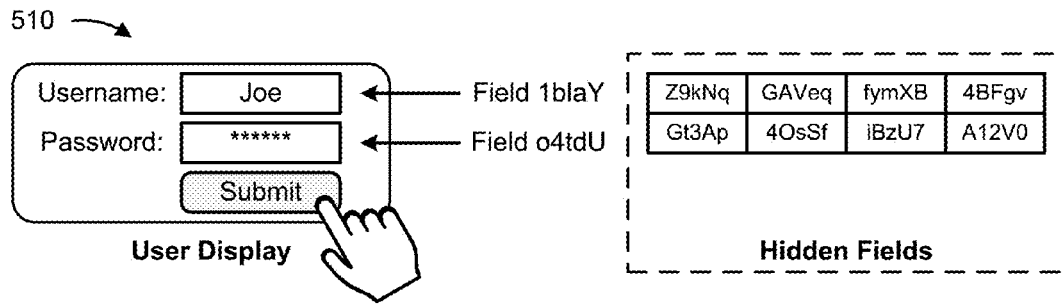

As shown in FIG. 5B, assume, for example implementation 510, that the client device is associated with a human user. Assume further that the client device receives the modified login page and interprets the instructions therein to display, on a user display, fields "1blaY" and "o4tdU" for receiving input associated with a username and password, respectively. Assume that the human enters a username (e.g., "Joe") in field "1blaY" and a corresponding password (shown as ******) in field "o4tdU." Assume further that the human does not enter any information associated with the hidden fields not displayed on the user display. Assume that the human directs the client device to submit a response, including the user input, by selecting a submit button.

Figure 5C:
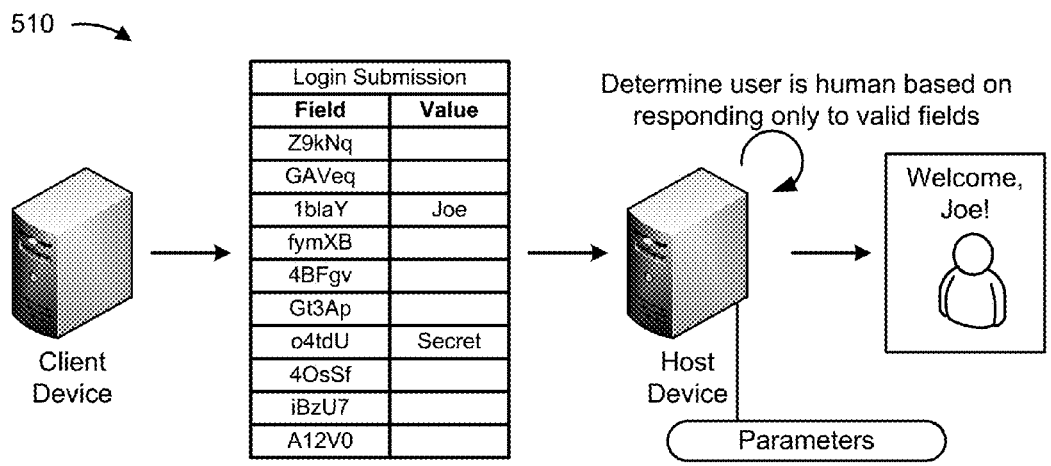

As shown in FIG. 5C, assume, for example implementation 510, that, based on the human selecting the submit button, the client device sends a login submission to the host device. Assume that the login submission includes values only for fields "1blaY" (e.g., "Joe") and "o4tdU" (e.g., "Secret"). Assume that the host device determines, based on the login submission and the parameters, that the client device has responded only to valid fields and therefore determines that a user of the client device is human. Based on determining that the user of the client device is human, the host device sends, to the client device, information associated with a successful login (e.g., "Welcome Joe!").

Figure 5D:
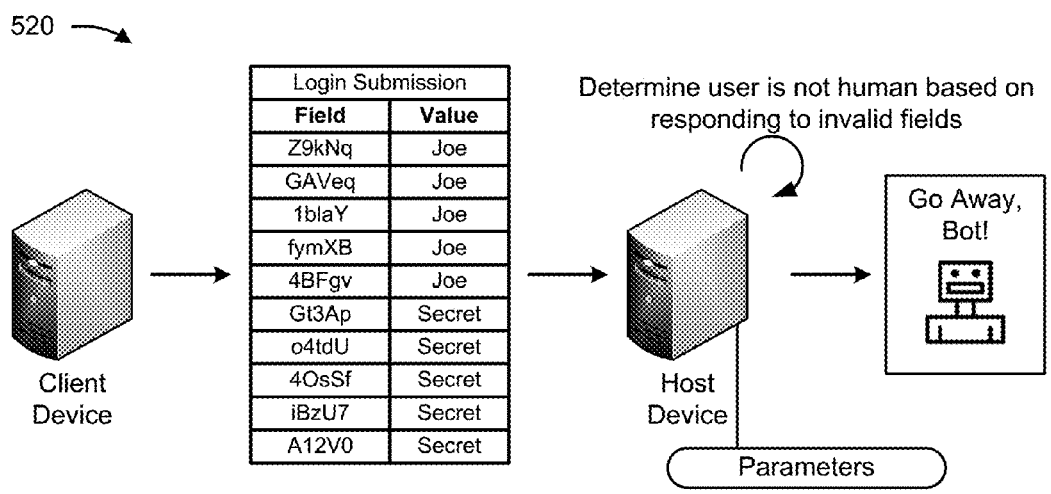

As shown in FIG. 5D, assume, for example implementation 520, that the host device instead receives a login submission including values associated with all the fields (e.g., "Joe" for half the fields and "Secret" for the other half). Assume that the host device determines, based on the login submission and the parameters, that the client device has responded to invalid fields and therefore determines that a user of the client device is not human. Based on determining that the user of the client device is not human, the host device sends, to the client device, information associated with an unsuccessful login (e.g., "Go Away, Bot!"). In some implementations, if a login submission includes one or more unmatched values, the host device may determine that a user of the client device is not human. In some implementations, the host device may hide fields in a particular manner (e.g., by overlaying a white image on fields to be hidden).

As indicated above, FIGS. 5A-5D are provided merely as an example. Other examples are possible and may differ from what was described with regard to FIGS. 5A-5D.

FIGS. 6A-6D are diagrams of an example implementation 600 relating to example process 400 shown in FIG. 4. FIGS. 6A-6D show an example of implementing a CAPTCHA to selectively reveal un-obfuscated information.

Figures 6A, 6B:
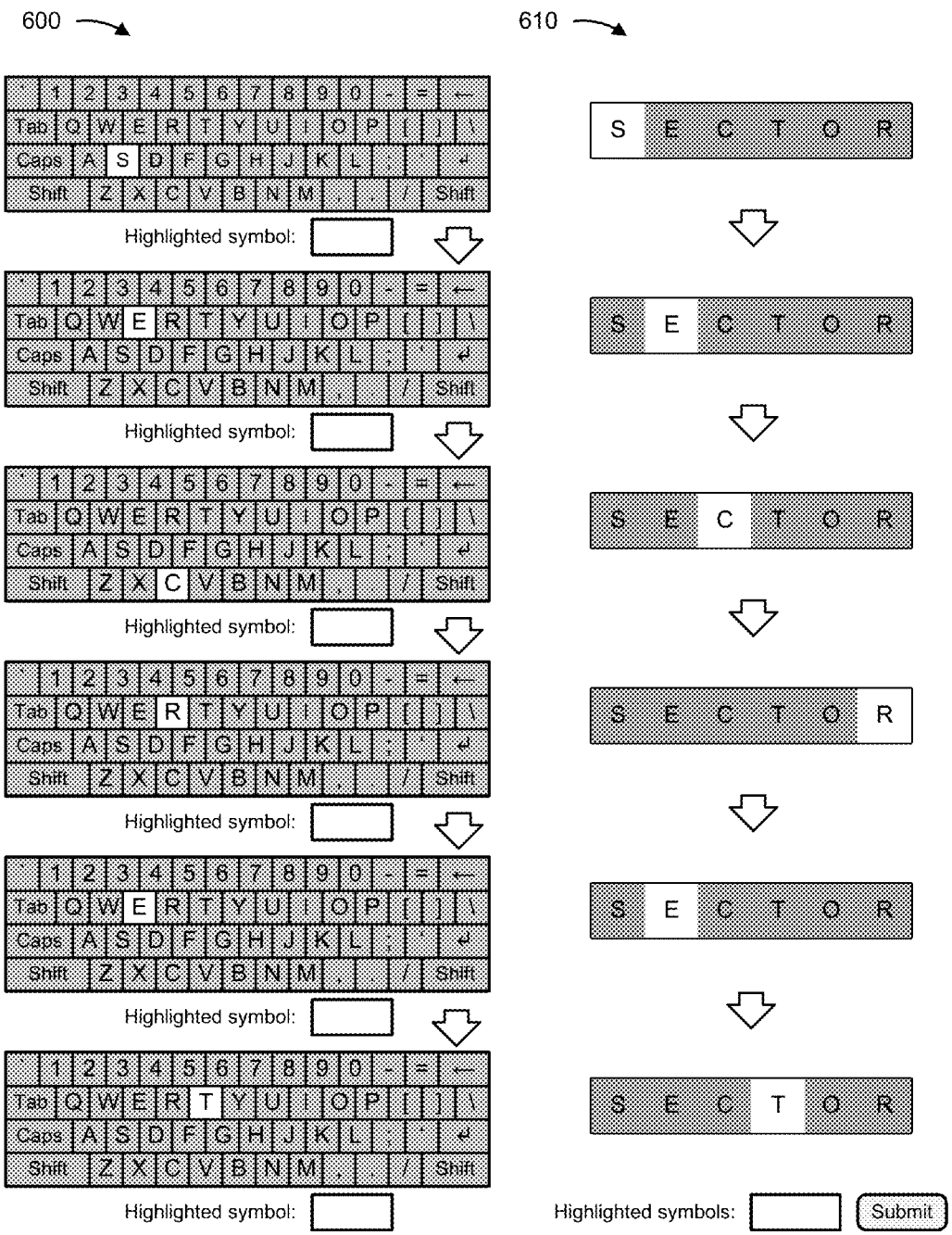
FIG. 6A-6D are diagrams of example implementations relating to the example process shown in FIG. 4.

As shown in FIG. 6A, assume, for example implementation 600, that a challenge, associated with a Turing test, includes a video, animation, text, image, and/or instructions directing a client device (e.g., client device 210) to display a computing keyboard. Assume further that the challenge directs the client device to sequentially and momentarily highlight characters of the keyboard (e.g., S-E-C-R-E-T) and directs a user of the client device to input the characters in the sequence highlighted. Assume further that a host device (e.g., host device 220) determines whether the client device is associated with a human based on comparing input, received from the client device, with stored parameters, identifying the characters in the sequence highlighted. In this way, the host device may use information, from the client device, regarding a sequence in which information is highlighted, to determine whether the client device is associated with a human.

As shown in FIG. 6B, assume, for example implementation 610, that a challenge, associated with a Turing test, includes a video, animation, text, image, and/or instructions directing a client device (e.g., client device 210) to display a sequence of characters (e.g., S-E-C-T-O-R). Assume further that the challenge directs the client device to sequentially and momentarily highlight characters of the sequence of characters (e.g., S-E-C-R-E-T) and directs a user of the client device to input the characters in the sequence highlighted. Assume further that a host device (e.g., host device 210) determines whether the client device is associated with a human based on comparing input, received from the client device, with stored parameters, identifying the characters in the sequence highlighted. In this way, the host device may use information, from the client device, regarding a sequence in which information is to be highlighted, to determine whether the client device is associated with a human.

Figures 6C, 6D:
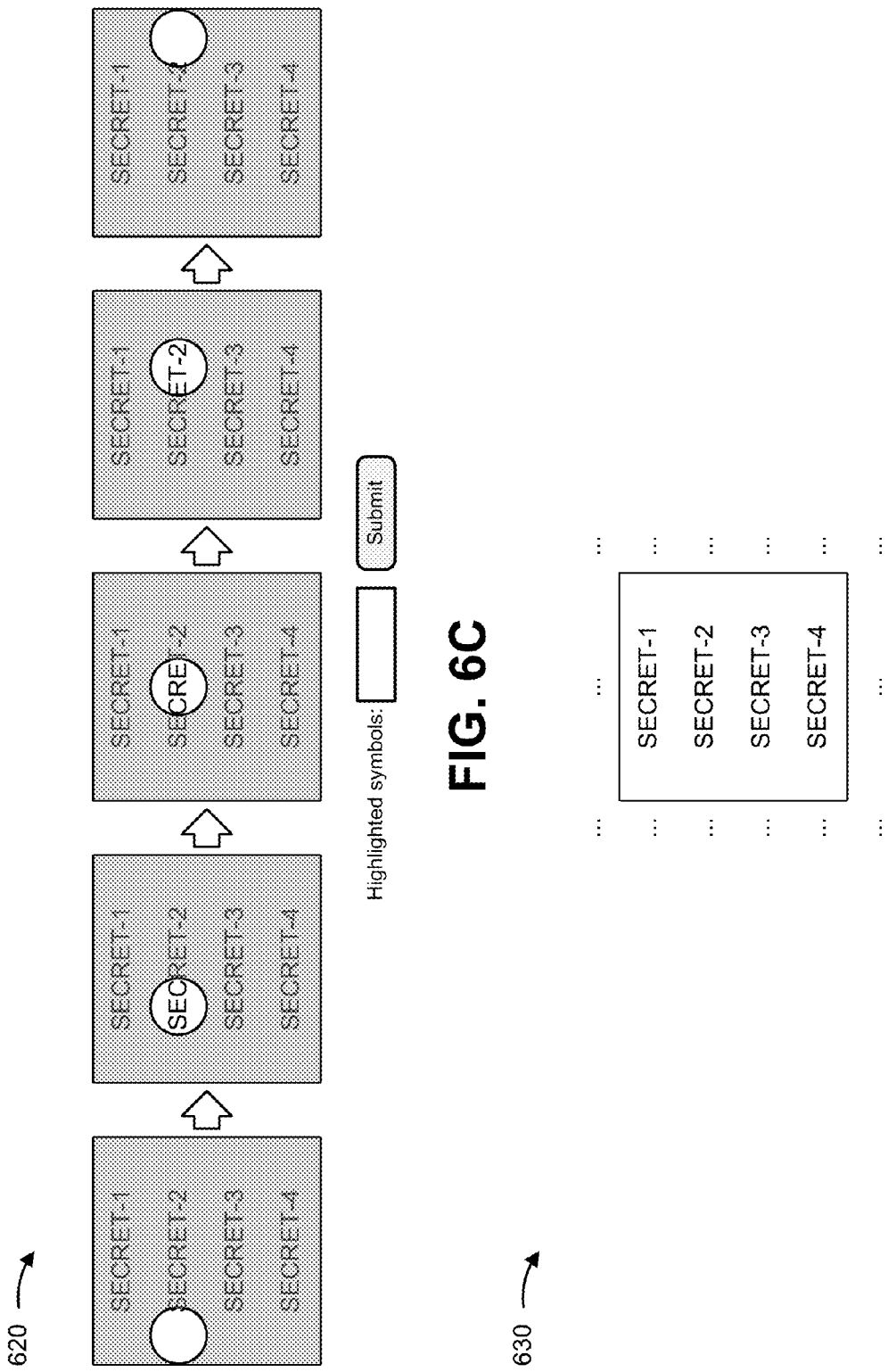

As shown in FIG. 6C, assume, for example implementation 620, that a challenge, associated with a Turing test, includes a video, animation, text, image, and/or instructions directing a client device (e.g., client device 210) to display four sequences of characters (e.g., SECRET-1, SECRET-2, SECRET-3, and SECRET-4). Assume further that the challenge directs the client device to move a spotlight over a particular sequence of characters (e.g., SECRET-2) and directs a user of the client device to input the particular sequence of characters over which the spotlight was moved. Assume further that a host device (e.g., host device 210) determines whether the client device is associated with a human based on comparing input, received from the client device, with stored parameters, identifying the particular sequence of characters. In this way, the host device may use information, from the client device, regarding a particular portion of information to be selectively highlighted, to determine whether the client device is associated with a human.

As shown in FIG. 6D, assume, for example implementation 630, that the challenge of example implementation 620 further includes a quantity of other sequences of characters in addition to the four sequences of characters (e.g., SECRET-1, SECRET-2, SECRET-3, and SECRET-4). Assume, however, that the video, animation, text, image, and/or instructions direct the client device to display only the four sequences of characters and not the quantity of additional sequences of characters. Assume further that, as in example implementation 620, the challenge directs the client device to move a spotlight over a particular sequence of characters (e.g., SECRET-2) and directs a user of the client device to input the particular sequence of characters over which the spotlight was moved. Assume further that a host device (e.g., host device 210) determines whether the client device is associated with a human based on comparing input, received from the client device, with stored parameters. In this way, the host device may use information, from the client device, regarding a particular portion of information to be selectively displayed and highlighted, to determine whether the client device is associated with a human.

As indicated above, FIGS. 6A-6D are provided merely as examples. Other examples are possible and may differ from what was described with regard to FIGS. 6A-6D. For example, the examples of FIGS. 6A-6D may be combined with each other and/or with the example of FIGS. 5A-5D (e.g., as a single Turing test and/or a series of Turing tests). For example, a single challenge may include both randomly named, selectively revealed input fields and one or more selectively revealed sequences and/or portions of information. Alternatively, or additionally, the host device may selectively provide, to the client device, a subsequent challenge based on the response received, from the client device, to the challenge. For example, the host device may provide, to the client device, a series of challenges based on receiving a corresponding series of responses.

Implementations described herein may assist a host device in determining whether a user, associated with a client device, is a human, without undue delay or burden to the human user, by administering, to the client device, a CAPTCHA based on selectively revealed un-obfuscated information.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors, implemented at least partially in hardware, to:
receive a request from a client device;
identify a session identifier associated with the request;
generate, based on the request and the session identifier, a challenge associated with a Turing test,
the challenge directing the client device to reveal a first group of information and obscure a second group of information;
generate, based on the request and the session identifier, a metric associated with the challenge,
the metric identifying the first group of information;
provide, to the client device and based on the request, the challenge;
receive a response, to the challenge, from the client device;
determine, based on the metric, whether the response satisfies the challenge,
the response not satisfying the challenge when the response is not associated with the session identifier; and
selectively perform an action based on determining whether the response satisfies the challenge.

2. The device of claim 1, where the request is associated with a page,
the page including a set of input fields associated with providing user input,
the first group of information corresponding to a first quantity of a set of alternative input fields that correspond to the set of input fields,
each input field, of the set of input fields, corresponding to a single randomly generated field identifier of the first group of information,
the second group of information corresponding to a second quantity of the set of alternative input fields,
each input field, of the set of input fields, corresponding to one or more randomly generated field identifiers of the second group of information, and
the challenge including the first group of information and the second group of information.

3. The device of claim 1, where the one or more processors, when determining whether the response satisfies the challenge, are to:
determine that the response satisfies the challenge based on the response including information associated with user input to the second group of information.

4. The device of claim 1, where the challenge directs the client device to display an image of a set of keys and to highlight a particular sequence of keys of the set of keys, and
where the one or more processors, when determining whether the response satisfies the challenge, are to:
determine that the response satisfies the challenge based on the response identifying the particular sequence of keys.

5. The device of claim 1, where the challenge directs the client device to display a plurality of characters and to highlight a particular sequence of characters of the plurality of characters, and
where the one or more processors, when determining whether the response satisfies the challenge, are to:
determine that the response satisfies the challenge based on the response identifying the particular sequence of characters.

6. The device of claim 1, where the challenge directs the client device to obfuscate a plurality of characters and to reveal the first group of information by identifying a particular sequence of characters of the plurality of obfuscated characters, and
where the one or more processors, when determining whether the response satisfies the challenge, are to:
determine that the response satisfies the challenge based on the response identifying the particular sequence of characters.

7. The device of claim 1, where the challenge directs the client device to display a first sequence of characters and to selectively reveal the first group of information by highlighting characters, from the first sequence of characters, to identify a second sequence of characters, and
where the one or more processors, when determining whether the response satisfies the challenge, are to:
determine that the response satisfies the challenge based on the response identifying the second sequence of characters and not the first sequence of characters.

8. A non-transitory computer-readable medium storing instructions, the instructions comprising:
one or more instructions that, when executed by one or more processors, cause the one or more processors to:
receive a request from a client device;
identify a session identifier associated with the request;

generate, based on the request and the session identifier, a challenge associated with a Turing test,
the challenge directing the client device, to reveal a first group of information, and obscure a second group of information;
generate, based on the request and the session identifier, a metric associated with the challenge,
the metric identifying the first group of information;
provide, to the client device and based on the request, the challenge;
receive, from the client device, a response based on providing the challenge;
determine, based on the metric, whether the response satisfies the challenge,
the response not satisfying the challenge when the response is not associated with the session identifier; and
selectively perform an action based on determining whether the response satisfies the challenge.

9. The non-transitory computer-readable medium of claim 8, where the one or more instructions further cause the one or more processors to:
identify information associated with the request,
the identified information including an input field for user input; and
generate a plurality of input fields,
the first group of information including:
a portion of the identified information, and
a particular input field selected at random from the plurality of input fields, and
the second group of information including:
one or more other fields of the plurality of input fields.

10. The non-transitory computer-readable medium of claim 8, where the one or more instructions further cause the one or more processors to:
determine, based on the metric, a score associated with the response,
the metric including:
a first metric associated with identifying the first group of information, and
a second metric associated with distinguishing the first group of information from the second group of information, and
the score including:
a first score associated with assessing the response based on the first metric, and
a second score associated with assessing the response based on the second metric; and
determine, based on the first score and the second score, whether the response satisfies the challenge.

11. The non-transitory computer-readable medium of claim 8, where:
the second group of information includes a group of characters, and
the first group of information includes particular characters of the group of characters and a sequence associated with the particular characters.

12. The non-transitory computer-readable medium of claim 11, where the challenge directs the client device to:
progressively reposition a highlighted portion of the second group of information,
the highlighted portion revealing the particular characters, and
the repositioned highlighted portion revealing the sequence associated with the particular characters.

13. The non-transitory computer-readable medium of claim 8, where the second group of information includes the first group of information.

14. The non-transitory computer-readable medium of claim 8, where:
the request is associated with a page,
the page including a set of input fields associated with providing user input,
the first group of information corresponds to a first quantity of a set of alternative input fields corresponding to the set of input fields,
each input field, of the set of input fields, corresponding to a single randomly generated field identifier of the first group of information,
the second group of information corresponds to a second quantity of the set of alternative input fields,
each input field, of the set of input fields, corresponding to one or more randomly generated field identifiers of the second group of information, and
the challenge includes the first group of information and the second group of information.

15. A method, comprising:
receiving, by a device, a request from a client device;
identifying, by the device, a session identifier associated with the request;
generating, by the device and based on the request and the session identifier, a challenge associated with a Turing test,
the challenge directing the client device to reveal a first group of information and obscure a second group of information;
generating, by the device, a metric associated with the challenge,
the metric identifying the first group of information;
providing, by the device and based on the request, the challenge to the client device;
receiving, by the device, a response from the client device based on the providing the challenge to the client device;
determining, by the device and based on the metric, whether the response satisfies the challenge,
the response not satisfying the challenge when the response is not associated with the session identifier; and
selectively performing, by the device, an action based on determining whether the response satisfies the challenge.

16. The method of claim 15, further comprising:
determining whether the request includes an input associated with other information; and
determining that the response does not satisfy the challenge based on determining that the request includes the input associated with the other information.

17. The method of claim 15, further comprising:
determining whether the response includes the first group of information; and
determining that the response satisfies the challenge based on determining that the response includes the first group of information.

18. The method of claim 15, further comprising:
determining that the response identifies the first group of information; and
determining that the response does not identify the second group of information.

19. The method of claim 18, where the first group of information is associated with a sequence, and the method further comprises:

determining that the response identifies the sequence associated with the first group of information.

20. The method of claim 15, where:

the second group of information includes a group of characters;

the first group of information includes particular characters of the group of characters and a sequence associated with the particular characters; and the challenge directs the client device to reposition a highlighted portion of the second group of information, the highlighted portion revealing the particular characters, and the repositioned highlighted portion revealing the sequence associated with the particular characters.

* * * * *